(12) United States Patent
Volk

(10) Patent No.: US 12,447,753 B2
(45) Date of Patent: Oct. 21, 2025

(54) DEVICE FOR MARKING A COMPONENT, COMPRISING A MULTI-PART HOUSING

(71) Applicant: Schaeffler Technologies AG & Co. KG, Herzogenaurach (DE)

(72) Inventor: Wolfgang Volk, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 274 days.

(21) Appl. No.: 18/036,928

(22) PCT Filed: Oct. 4, 2021

(86) PCT No.: PCT/DE2021/100794
§ 371 (c)(1),
(2) Date: May 15, 2023

(87) PCT Pub. No.: WO2022/100778
PCT Pub. Date: May 19, 2022

(65) Prior Publication Data
US 2023/0415494 A1    Dec. 28, 2023

(30) Foreign Application Priority Data
Nov. 13, 2020   (DE) .......................... 102020129975.3

(51) Int. Cl.
*B41J 2/44*    (2006.01)
*B23K 26/352*    (2014.01)
(Continued)

(52) U.S. Cl.
CPC ............ *B41J 2/442* (2013.01); *B23K 26/355* (2018.08); *B23K 26/706* (2015.10);
(Continued)

(58) Field of Classification Search
CPC . B41J 2/442; B41J 3/407; B41J 29/13; B23K 26/0006; B23K 26/127;
(Continued)

(56) References Cited

U.S. PATENT DOCUMENTS

| | | | | |
|---|---|---|---|---|
| 4,156,124 A | * | 5/1979 | Macken | ................... B44B 7/00 219/121.73 |
| 4,694,139 A | * | 9/1987 | Roder | ................... B23K 26/10 219/121.79 |

(Continued)

FOREIGN PATENT DOCUMENTS

| | | |
|---|---|---|
| CN | 103221174 A | 7/2013 |
| DE | 19611713 A1 | 10/1997 |

(Continued)

*Primary Examiner* — Anh T Vo
(74) *Attorney, Agent, or Firm* — Volpe Koenig

(57) ABSTRACT

A device for marking a component. The device includes a laser device for generating a laser marking beam, a support surface for providing the component to be marked, and a housing for housing a working region between the laser
(Continued)

device and the component to be marked. The housing has a multi-part design, and the housing includes at least a first housing part and a second housing part. The two housing parts are designed to be movable relative to each other and are arranged such that in a loading position, the housing provides an open working region, by means of which the component to be marked can be introduced into the working region, and in a working position, the housing completely closes the working region.

18 Claims, 4 Drawing Sheets

(51) Int. Cl.
    *B23K 26/70*     (2014.01)
    *B23K 37/00*     (2025.01)
    *B23K 37/006*     (2025.01)
    *B41J 3/407*     (2006.01)
    *B41J 29/13*     (2006.01)

(52) U.S. Cl.
    CPC ............ *B23K 37/006* (2013.01); *B41J 3/407* (2013.01); *B41J 29/13* (2013.01)

(58) Field of Classification Search
    CPC .. B23K 26/342; B23K 26/355; B23K 26/362; B23K 26/40; B23K 26/706; B23K 37/006; B33Y 80/00
    See application file for complete search history.

(56) References Cited

U.S. PATENT DOCUMENTS

| | | | | |
|---|---|---|---|---|
| 4,972,062 A | * | 11/1990 | Aharon | ............... B23K 26/10 |
| | | | | 219/121.74 |
| 6,160,835 A | | 12/2000 | Kwon | |
| 9,216,476 B1 | | 12/2015 | Grimes | |
| 2003/0102293 A1 | * | 6/2003 | Therond | ............ B23K 26/064 |
| | | | | 219/121.78 |
| 2018/0257175 A1 | | 9/2018 | Lee et al. | |

FOREIGN PATENT DOCUMENTS

| | | |
|---|---|---|
| DE | 10059246 A | 6/2002 |
| DE | 102010051539 A1 | 5/2012 |
| DE | 102013018196 A1 | 4/2015 |
| DE | 102015007828 A1 | 12/2016 |
| EP | 2564977 A2 | 3/2013 |
| JP | 2009214141 A | 9/2009 |

* cited by examiner

DEVICE FOR MARKING A COMPONENT, COMPRISING A MULTI-PART HOUSING

CROSS-REFERENCE TO RELATED APPLICATIONS

This application is the U.S. National Phase of PCT Appln. No. PCT/DE2021/100794, filed Oct. 4, 2021, which claims the benefit of German Patent Appl. No. 102020129975.3, filed Nov. 13, 2020, the entire disclosures of which are incorporated by reference herein.

TECHNICAL FIELD

The present disclosure relates to a device for marking a component, comprising a laser device for generating a laser marking beam, a support surface for providing the component to be marked, and a housing for housing a working region between the laser device and the component to be marked.

Various laser marking devices with different structures and different types of protective devices are already known from the prior art.

BACKGROUND

A device for marking identification plates is already known from DE 10 2010 051 539 A1. This device comprises a support surface for the identification plates in order to mark them with a laser marking device. Furthermore, this device comprises a housing for housing a laser beam emerging from the laser marking device and directed onto the support surface, wherein the housing has a lower housing part and a covering hood arranged on or above the lower housing part. In addition, it is provided that the support surface is arranged on a turntable which can be rotated about an axis of rotation fixed to the housing, which is arranged between the lower housing part and the covering hood and protrudes laterally beyond the covering hood and between a marking position in which the support surface is completely covered by the covering hood, and a loading position in which the support surface is completely outside the covering hood. The turntable has two sealing ribs, which extend radially from the axis of rotation and protrude from the support surface and rest against a front wall of the covering hood in the marking position.

DE 100 59 246 A1 describes a device which, for guiding a laser beam onto a workpiece to be machined, comprises a sealing element which, together with the workpiece, forms a closed, light-tight interior space, and which also comprises a light-sensitive sensor which is coupled to a control device and stops the laser beam when light enters the interior space from the outside.

SUMMARY

The disclosure is based on the object of providing a device for laser marking a component which is configured in an optimized manner with regard to the complexity of a protective device. In addition, further improved handling with at least the same high safety standard should advantageously be ensured.

This object is achieved by a device for marking a component with the features of claim 1. A device designed according to the disclosure comprises a laser device for generating a laser marking beam for marking the component, a support surface for providing the component to be marked, and a housing for housing a working region between the laser device and the component to be marked, so that the working region is closed off in a laser beam-tight manner.

According to the disclosure, the housing has a multi-part design and comprises at least a first housing part and a second housing part, wherein the two housing parts are designed to be movable relative to one another and are arranged such that in a loading position, the housing provides an open working region, by means of which the component to be marked can be introduced into the working region, and in a working position, the housing closes the working region in a completely laser beam-tight manner. This achieves the advantage that a protective device could be provided which is optimized with regard to the required number of individual components for a housing that shields the working region in a laser beam-tight manner. In addition, a device for laser marking components could be provided, which could be further optimized both with regard to their handling and with regard to occupational safety.

Further advantageous embodiments of the disclosure are specified in the dependent claims. The features listed individually in the dependent claims can be combined with one another in a technologically meaningful manner and can define further embodiments of the disclosure. In addition, the features indicated in the claims are specified and explained in more detail in the description, in which further preferred embodiments of the disclosure are shown.

According to an advantageous embodiment of the disclosure, it can be provided that the support surface supporting the component to be marked is aligned in the horizontal plane, in particular designed as a rotary table that can be rotated in the horizontal plane. The advantage of this configuration lies in the fact that a device for laser marking could be created which requires only little installation space and at the same time ensures high cycle rates in production.

According to a further preferred further development of the disclosure, it can also be provided that the two housing parts are arranged such that they can be moved relative to one another in the vertical direction. The first housing part is advantageously designed as a part that is fixed relative to the laser device or a support, and the second housing part is designed as a part that is movable relative to the first housing part. The second housing part is particularly preferably designed to be displaceable, at least in regions, upwards into the first housing part. The second housing part can in particular be designed in the form of a frame part that is open at the top and bottom, while the first housing part can be designed, for example, as an upside-down pot-shaped part. When the second housing part is pushed in upwards, a component to be marked can be placed under the housing and the housing can be sealed in a laser beam-tight manner by moving it back vertically downwards, in that the second housing part closes the working region between the support and the first housing part. As a result, a housing for a laser marking device that is structurally simple, inexpensive and optimized in terms of handling can be provided.

According to a further particularly preferred embodiment of the disclosure, it can be provided that the housing also has at least a third housing part, wherein the first housing part is designed to be fixed and closes off or houses the working space at the top and wherein the second housing part opposite the working surface and the first housing part is designed to be vertically displaceable between the working surface and the first housing part, as has already been described above in the two-part embodiment. In the three-part development, the second housing part is arranged as a central housing part in the vertical extension direction, so that it houses a central part of the working region in the working position. The third housing part is now arranged on the opposite side of the support surface from the first and the second housing part and is designed to be vertically displaceable in a direction away from the support surface for the transfer into the loading position. This creates a housing that is optimized in terms of its structure, which uses only a few housing parts to house the laser beam-tight housing of a working region around a component placed on the support surface of a rotary table for a laser marking process.

The second housing part, which is designed such that it can be pushed into the first housing part at least in regions for the transfer between a working position and a loading position, is sealed against the first housing part in a laser beam-tight manner. For this purpose, a seal for laser beam-tight sealing of the two housing parts is formed between the first housing part and the second housing part. This seal is advantageously designed as a labyrinth seal. This creates a constructively simple solution for a laser beam-tight sealing of two housing parts that can be pushed into one another.

In a likewise preferred embodiment variant of the disclosure, it can also be provided that the second housing part has a first sealing means at least in regions on its end face facing the third housing part for laser beam-tight sealing of the two housing parts relative to one another and the third housing part has a second sealing means corresponding to the first sealing means at least in regions on its end face facing the second housing part. Here, too, the first sealing means and the second sealing means are advantageously designed in the form of a labyrinth seal, so that a constructively simple and effective laser beam seal could be created between the second and third housing part.

According to a further preferred embodiment of the subject matter of the disclosure, a position sensor can be provided for detecting the working position. The position sensor is designed in particular in such a way that it detects the closed position between the second housing part and the third housing part in the region of the support surface. In this way it can be achieved that the laser device is not activated until the housing is closed in a laser beam-tight manner. Furthermore, it can be ensured in this way that the closed position can be monitored, so that the laser device can be deactivated in the event of an unintentional partial opening of the housing.

Finally, the disclosure can also be advantageously implemented such that the housing has at least one air duct opening for connection to a ventilation or suction system, wherein the air duct opening is advantageously formed within the fixed first housing part. As a result, a permanently clean working region can be created with structurally simple means and high-quality marking of components can be made possible.

Preferably, at least one of the housing parts, particularly preferably all housing parts of the housing, are designed to be produced by an additive manufacturing process. Advantageously, the housing parts are designed to be produced using a 3D printing process.

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so that where applicable, explanations from other figures can also be used.

DETAILED DESCRIPTION

Figure 1:
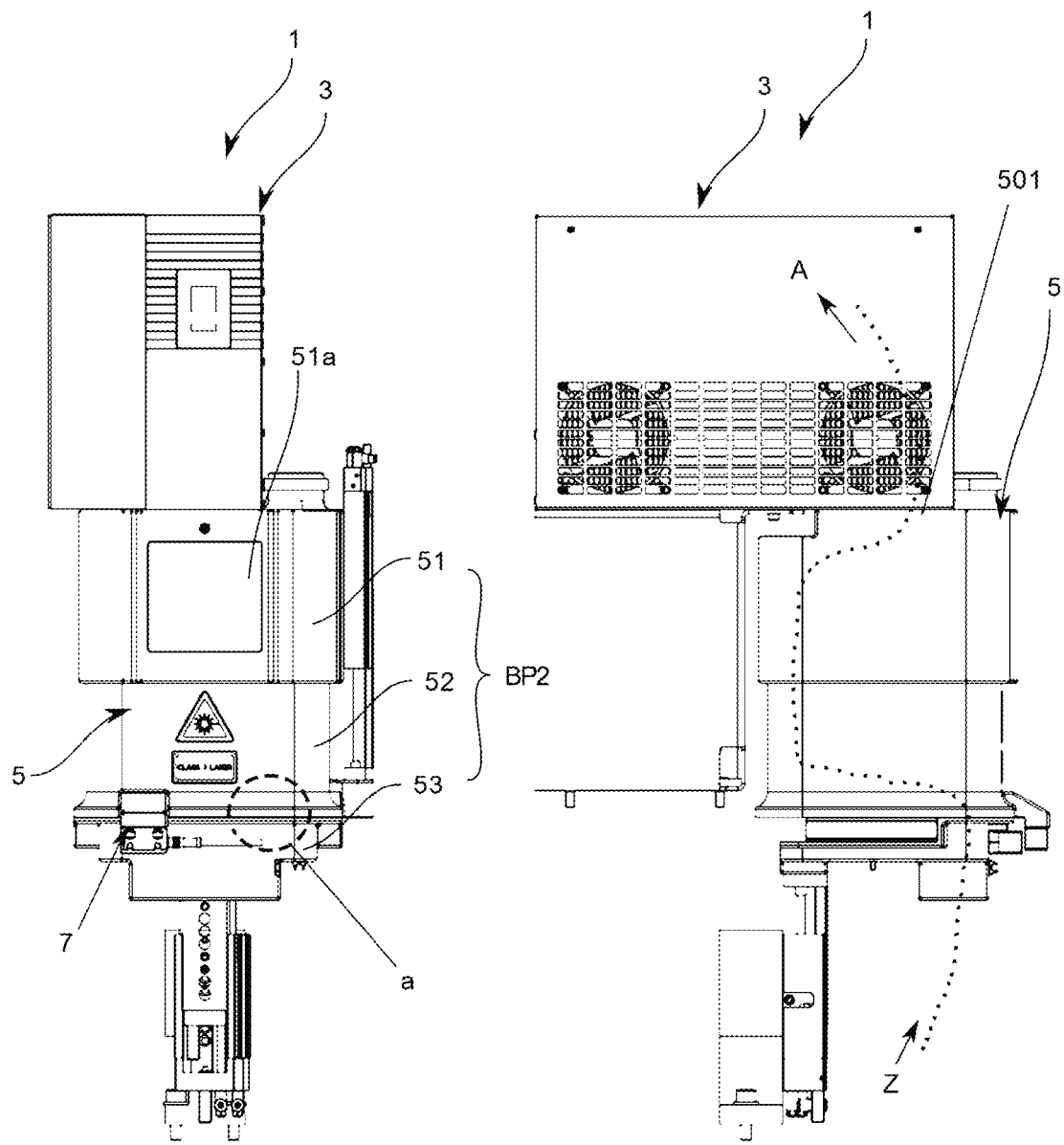
FIG. 1 shows a laser marking station with a protective housing in a front view (left) and in a side view (right)

FIG. 1 shows a device 1 for marking a component 2 (laser marking station) with a protective housing in a front view (left) and in a side view (right). The device 1 shown for marking a component 2 comprises a laser device 3 for generating a laser marking beam, a support surface 4 for providing the component 2 to be marked, and a housing 5 in the form of a protective housing for housing a working region 6 formed on or around the support surface 4 between the laser device 3 and the component 2 to be marked. The housing 5 has a multi-part design and in the exemplary embodiment shown comprises a first (upper) housing part 51, a second (central) housing part 52, and a third (lower) housing part 53. The first housing part 51 and the second housing part 52 are designed and arranged to be movable relative to one another in the vertical direction in such a way that the housing 5 provides an open working region 6 in a loading position BP1 (see FIG. 4), by means of which the component 2 to be marked can be introduced into the working region 6, and that the housing 5 completely closes off the working region 6 in a working position BP2, so that no laser radiation can escape from the working region 6 housed by the housing 5.

Figure 3:
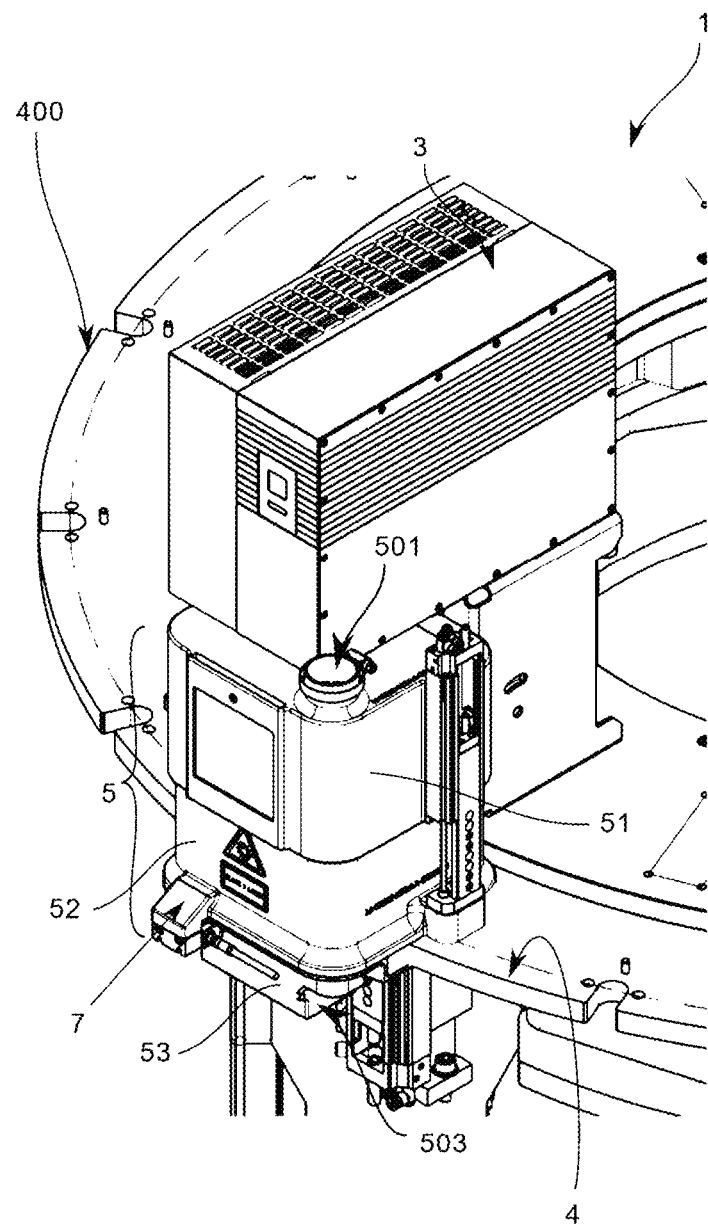
FIG. 3 shows a laser marking station with a support surface, formed by a rotary table designed to be rotatable, in a perspective view with the protective housing closed.

The support surface 4 supporting the component 2 to be marked is aligned in the horizontal plane and, as shown in FIG. 3, is designed as a rotary table 400 that can be rotated in the horizontal plane. The two housing parts 51, 52 are arranged to be movable relative to one another in the vertical direction, wherein the first housing part 51 is designed as a part that is fixed (stationary) in relation to the laser device 3, while the second housing part 52 can be pushed into the first housing part 51 at least in regions for the transfer from the working position (closed housing) to the loading position BP1 (open housing), wherein a seal is formed between the first housing part 51 and the second housing part 52 for laser beam-tight sealing of the two housing parts 51, 52 relative to one another.

The third (lower) housing part 53 is arranged on the side of the support surface 4 vertically opposite the first and the second housing part 51, 52 (underneath the support surface of the rotary table 400) and is designed and arranged to be vertically displaceable downwards in a direction away from the support surface 4. In addition, the air flow for suction of the closed working region is shown schematically in a dotted line in the right-hand illustration. Ambient air in the form of supply air Z is sucked into the working space through an opening in the lower, third housing part 53 and extracted as exhaust air A through a further opening in the housing 5 in the upper, first housing part 51. For this purpose, the opening of the first housing part 51 can be connected to a corresponding suction device.

Figure 2:
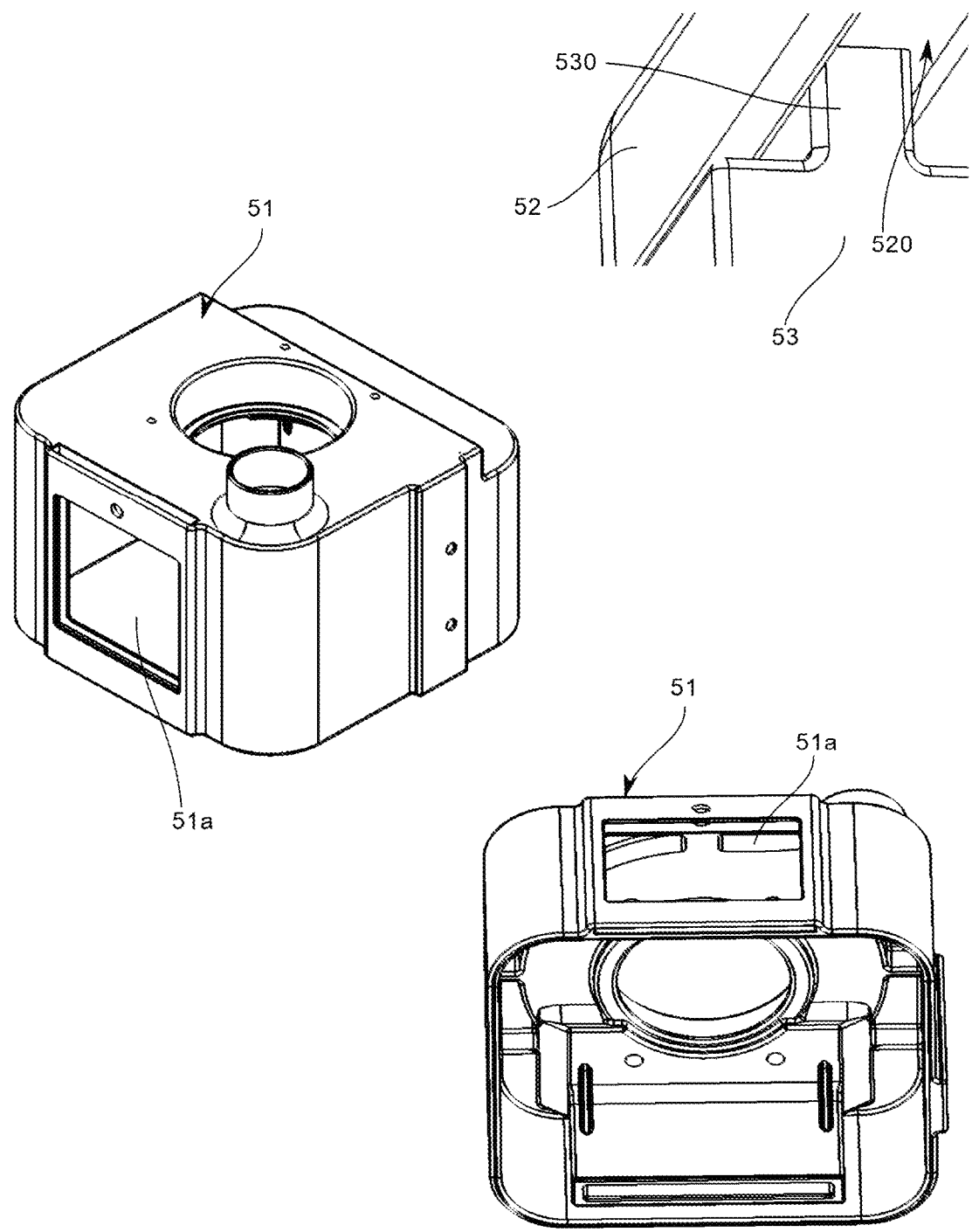
FIG. 2 shows an enlarged partial section "a" according to FIG. 1 (top right), as well as the first housing part of the protective housing in two different perspective views (central and from below)

FIG. 2 shows an enlarged partial section "a" according to FIG. 1 in the view at the top right, as well as views centrally and from below of the first housing part 51 of the protective housing or of the housing 5 in different perspective views. As shown in the illustration above, the second housing part 52 has a first sealing means 520 on its end face facing the third housing part 53 for sealing the two housing parts 52, 53 relative to one another in a light-tight and laser beam-tight manner, and the third housing part 53 has a second sealing means 530 corresponding to the first sealing means 520 on its end face facing the second housing part 52. A labyrinth seal is formed by the first sealing means 520 and the second sealing means 530. It is also shown that the first housing part 51 has a laser beam-tight viewing window 51*a*, via which an operator can observe the component 2 to be marked through the viewing window 51*a* during the marking process.

FIG. 3 shows the device 1 (laser marking station) with a support surface 4, formed by a rotary table 400 designed to be rotatable, in a perspective view with a closed protective housing or closed housing 5. In this case, the second housing part 52 is fully extended downwards out of the first housing part 51 and covers the component 2 to be marked in a laser beam-tight manner at the top and at the sides. It can also be seen from FIG. 3 that a position sensor 7 is provided for detecting the working position BP2, or for detecting whether the housing 5 is in a closed state, wherein the position sensor 7 is designed in such a way that it detects the closed position between the (central) second housing part 52 and the (lower) third housing part 53. Finally, FIG. 3 also shows that the housing 5 has a first air duct opening 501 in the upper first housing part 51 for connection to a ventilation or suction system and that the housing 5 has a second air duct opening 503 in its lower third housing part 52 for the entry of the above the air sucked in through the first air duct opening 501.

Figure 4:
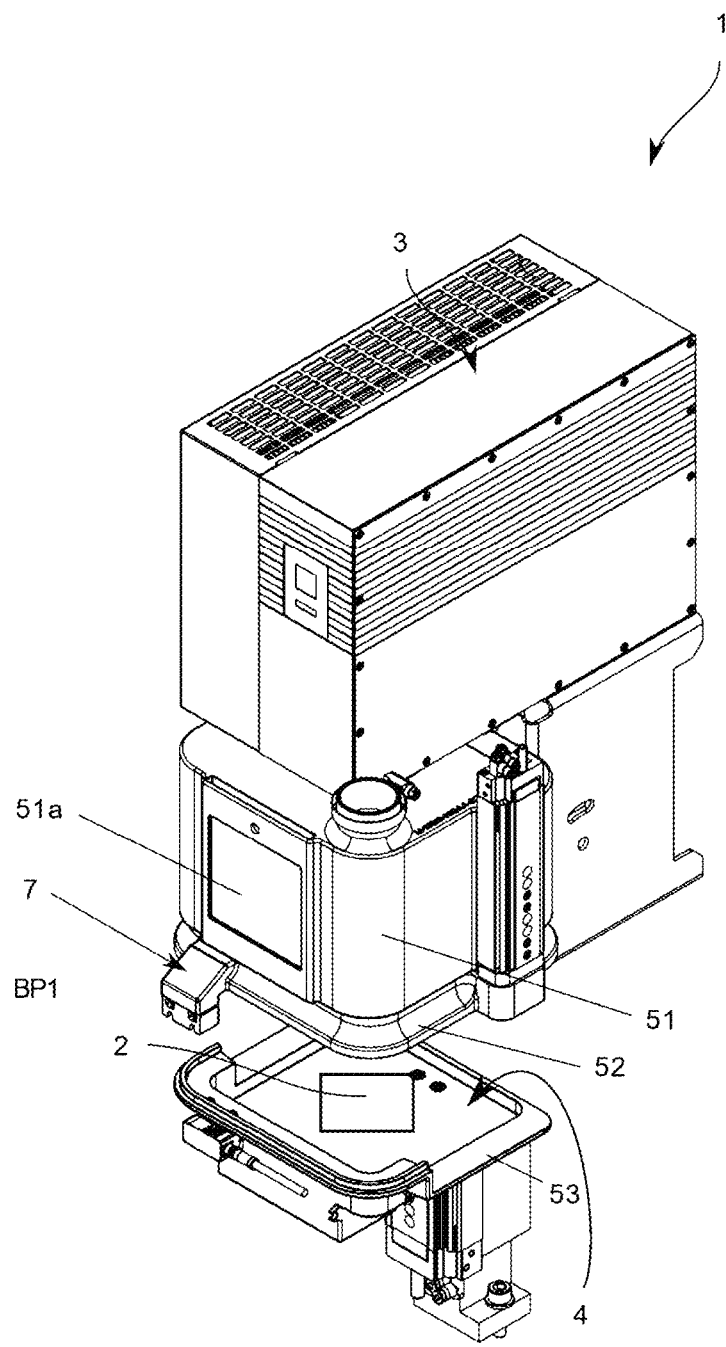
FIG. 4 shows a laser marking station in a perspective view with the protective housing open and the component to be marked shown schematically.

FIG. 4 shows the device 1 (laser marking station) in a perspective view with the protective housing open and the component 2 to be marked shown schematically. This view clearly shows that the second central housing part 52 and the third lower housing part 53 are sealed relative to one another in a front region via their corresponding vertical end faces in a laser beam-tight manner, while in a remaining (rear) area the sealing of the second housing part 52 and the third housing part 53 is carried out in each case against the rotary table 400 which is rotatably arranged in this region—for example via corresponding flexibly designed sealing elements.

The disclosure is not limited to the embodiments shown in the figures. The above description should therefore be regarded as explanatory rather than restrictive. The following claims are to be understood as meaning that a said feature is present in at least one embodiment of the disclosure. This does not preclude the presence of other features. Where the claims and the foregoing description define 'first' and 'second' features, this designation serves to distinguish two features of the same kind without establishing an order of precedence.

LIST OF REFERENCE NUMERALS

1 Device
2 Component (to be marked)
3 Laser device
4 Support surface
400 Rotary table
5 Housing
51 First housing part
501 First air duct opening (in the first housing part)
51*a* Viewing window
52 Second housing part
520 Sealing means (second housing part)
53 Third housing part
503 Second air duct opening (in the third housing part)
530 Sealing means (third housing part)
6 Working region
7 Position sensor
BP1 Loading position
BP2 Working position
L Suction airflow

The invention claimed is:

1. A device for marking a component, the device comprising:
a laser device for generating a laser marking beam, a support surface for supporting the component, and a housing for housing a working region between the laser device and the component, wherein the housing has at least a first housing part and a second housing part, wherein the first and second housing parts movable relative to one another and are arranged such that in a loading position, the housing provides an open working region into which the component can be introduced into the working region, and in a working position, the housing closes the working region in a laser beam-tight manner, wherein the housing has at least one air duct opening for connection to a ventilation or suction system, wherein the air duct opening is formed within the first housing part.

2. The device according to claim 1, wherein the support surface supporting the component is aligned in a horizontal plane, the support surface comprising-as a rotary table that can be rotated in the horizontal plane.

3. The device according to claim 1, wherein the first and second housing parts are arranged such that they can move relative to one another in a vertical direction.

4. The device according to claim 1, wherein the first housing part is fixed relative to the laser device or a support and the second housing part is movable relative to the first housing part.

5. The device according to claim 1, wherein the second housing part can be pushed into the first housing part at least in regions for the transfer to the loading position, wherein a seal is formed between the first housing part and the second housing part for laser beam-tight sealing of the two housing parts relative to one another.

6. The device according to claim 1, wherein the second housing part can be pushed into the first housing part at least in regions for the transfer to the loading position, wherein a seal is formed between the first housing part and the second housing part for laser beam-tight sealing of the two housing parts relative to one another.

7. A device for marking a component, the device comprising:
a laser device for generating a laser marking beam, a support surface for supporting the component, and a housing for housing a working region between the laser device and the component, wherein the housing has at least a first housing part and a second housing part, wherein the first and second housing parts movable relative to one another and are arranged such that in a loading position, the housing provides an open working region into which the component can be introduced into the working region, and in a working position, the housing closes the working region in a laser beam-tight manner, wherein the housing has at least a third housing part, wherein the first housing part fixed and houses the working region at a top, the second housing part opposite the support surface and the first housing part is vertically displaceable between the support surface and the first housing part and in the working position houses a central part of the working region, and the third housing part is arranged on a side of the support surface opposite the first and the second housing part and is vertically displaceable in a direction away from the support surface.

8. The device according to claim 7, wherein the second housing part has a first seal on an end face facing the third housing part for laser beam-tight sealing of the second and third housing parts relative to one another, and the third housing part has a second seal corresponding to the first seal on an end face facing the second housing part.

9. The device according to claim 8, wherein the first seal and the second seal include labyrinth seals.

10. The device according to claim 7, further comprising a position sensor for detecting the working position, wherein the position sensor detects the closed position between the first housing part and the third housing part.

11. The device according to claim 7, wherein at least one of the first, second or third housing parts is a 3D printed component.

12. A device for marking a component, the device comprising:
a laser device for generating a laser marking beam, a support surface for supporting the component, and a housing including working region between the laser device and the component, wherein the housing has at least a first housing part and a second housing part, wherein the first and second housing parts are movable relative to one another between a loading position providing an open working region into which the component can be introduced and a working position wherein the housing closes the working region in a laser beam-tight manner, wherein the housing has at least a third housing part, wherein the first housing part is fixed and houses a top of the working region, the second housing part opposite the support surface and the first housing part is vertically displaceable between the support surface and the first housing part and in the working position houses a central part of the working region, and the third housing part is arranged on a side of the support surface opposite the first and the second housing part and is vertically displaceable in a direction away from the support surface.

13. The device according to claim 12, wherein the support surface supporting the component is aligned in a horizontal plane, the support surface comprising a rotary table that can be rotated in the horizontal plane.

14. The device according to claim 12, wherein the first and second housing parts are arranged such that they can move relative to one another in a vertical direction.

15. The device according to claim 12, wherein the first housing part is fixed relative to the laser device or a support and the second housing part is movable relative to the first housing part.

16. The device according to claim 12, wherein the second housing part has a first seal on an end face facing the third housing part for laser beam-tight sealing of the second and third housing parts relative to one another, and the third housing part has a second seal corresponding to the first seal on an end face facing the second housing part.

17. The device according to claim 12, wherein the first seal and the second seal include labyrinth seals.

18. The device according to claim 12, further comprising a position sensor for detecting the working position, wherein the position sensor detects the closed position between the first housing part and the third housing part.

\* \* \* \* \*